United States Patent
Wei et al.

(10) Patent No.: US 7,769,416 B2
(45) Date of Patent: Aug. 3, 2010

(54) ENERGY-EFFICIENT DESIGN OF A MULTIMEDIA MESSAGING SYSTEM FOR MOBILE DEVICES

(75) Inventors: Bin Wei, Basking Ridge, NJ (US); Lin Zhong, Houston, TX (US)

(73) Assignee: AT&T Intellectual Property II, L.P., Reno, NV (US)

( * ) Notice: Subject to any disclaimer, the term of this patent is extended or adjusted under 35 U.S.C. 154(b) by 0 days.

(21) Appl. No.: 11/541,031

(22) Filed: Sep. 28, 2006

(65) Prior Publication Data

US 2008/0082553 A1   Apr. 3, 2008

(51) Int. Cl.
   *H04B 1/38* (2006.01)
(52) U.S. Cl. ................................. 455/574; 455/573
(58) Field of Classification Search ......... 455/572–574; 707/100–102
   See application file for complete search history.

(56) References Cited

U.S. PATENT DOCUMENTS

| | | | |
|---|---|---|---|
| 6,603,469 B1 * | 8/2003 | Gettemy et al. | 345/211 |
| 2005/0232284 A1 * | 10/2005 | Karaoguz et al. | 370/401 |
| 2006/0121954 A1 * | 6/2006 | Mock | 455/574 |
| 2007/0157018 A1 * | 7/2007 | Simon et al. | 713/100 |

* cited by examiner

*Primary Examiner*—Wilson Lee
(74) *Attorney, Agent, or Firm*—Moazzam & Associates, LLC

(57) ABSTRACT

A system and a method for implementing an energy-efficient multimedia messaging system to improve mobile device usability and maximize mobile device battery life. The disclosed system includes a hierarchical messaging system for multimedia content leveraging short message service (SMS), an embedded system-based new interface device, and the Internet capability of mobile network access devices which support programmatic control for a power optimization policy. This system reduces energy overhead in network access devices and improves the usability of the multimedia messaging service.

11 Claims, 7 Drawing Sheets

ENERGY-EFFICIENT DESIGN OF A MULTIMEDIA MESSAGING SYSTEM FOR MOBILE DEVICES

FIELD OF THE INVENTION

The present invention relates generally to reducing the energy overhead and improving the usability of multimedia messaging for mobile devices. More particularly, the present application relates to the ability to reduce usage of the wireless interface and increase the efficiency of the user interface to help maximize battery life in network access devices.

BACKGROUND OF THE INVENTION

While network access users have increasing demands for time-critical multimedia content, most popular content is created for consumption in a stationary environment, such as broadcast TV news programs. Because of mobility and resource constraints, network access users are normally unable to watch an entire program in order to know what is happening. Furthermore, different users have interests in different contents. Broadcasting multimedia content, therefore, may not be desirable for network access users, especially for mobile users. Instead, relevant multimedia content needs to be extracted according to a user's interest and delivered in a timely manner. The industrial prototype system underlying this invention provides such a service using multimedia messages.

Delivering multimedia messages to a network access device uses wireless and user interfaces which are known to be two of the most power-hungry components in a networked handheld device. The inventors' measurement and analysis show that 30 multimedia messages could easily exhaust the energy supply of a commercial Smartphone.

It is worth noting that while most other low-power system design efforts have focused on the device itself, e.g. better power management or dynamic voltage scaling policies, the invention examines the entire ecosystem in which a network access device operates; encompassing servers, middleware, embedded systems, network access devices, and user interfaces. Such an extension reveals great energy-saving opportunities.

The following is a description of a network access device used for a study of the power issue and a description of an existing multimedia messaging system.

Although cellular phones can enjoy the 2.5 G/3 G data services and WiFi networks provide a higher data rate, at the time of this writing, GPRS is the most widely available data access method. The invention employs an Audiovox SMT5600 Smartphone with GPRS from Cingular, as a typical network access device. System information is presented for the Audiovox SMT5600 in the following table.

| Wireless | GPRS Class 10 and Bluetooth |
| --- | --- |
| OS | Windows Mobile 2003 SE |
| Display | 2.2 inch, 176 × 220 TFT LCD with 64K Colors |
| Battery | 1064 mA-Hour |
| Audio | Integrated loud-speaker |

Power status was obtained by measuring the voltage drop cross a 100 mΩ sense resistor embedded in the power supply cord with a USB-1608FS module. A summary chart of the data collected on power usage follows.

| Component | Extra power (mW) |
| --- | --- |
| Idle | 20 |
| System busy | 370 |
| LCD | 13 |
| LCD Lighting | Between 56-212 |
| GPRS | Up to about 1600 |
| Bluetooth PENDING | Between 1-3 |
| TRANSFER | Up to about 300 |
| Loudspeaker | About 45 |

Note that "Idle" power is the basic case when the system is idle with the display turned off. The other cases have power consumption required by the corresponding components compared to the idle case. For example, the entry of "System busy" is the power consumption when the system is repeatedly carrying out discrete-cosine transforms (DCTs) as compared with the idle case. Note that loudspeaker power consumption can vary significantly, depending on the duty cycle incurred by the sound. The LCD lighting power data is for typical luminance for night-time reading. The GPRS power also can vary significantly, depending on the cellular network quality. "Bluetooth TRANSFER" is the power used by Bluetooth transmission at 115 Kbps data rate.

The table also shows the power demands of the user interface (display and loudspeaker) and for the wireless communication. Such a profile is typical for most Smartphones and handheld devices.

The existing multimedia messaging system FIG. 1 (Prior Art) is an industrial prototype service that delivers customized multimedia content to mobile users. It automatically monitors a large number of TV content feeds 102, extracts the content 110 that matches user interest profiles 104, repurposes the content 114, and delivers repurposed content to network access devices 118 according to device profiles 108. The system consists of a media processing platform (102, 110, 116) and a content delivery platform (104, 106, 112, 114, 118).

The prototype's FIG. 1 media processing platform (102, 110, 116) continuously records selected broadcast TV programs from several broadcasters using satellite or cable feeds based on a predetermined schedule and according to the interests 104 of the target audience. These structured video feeds from broadcast television are digitized, compressed and stored in a database 116. The user profile record 104 is processed to identify the content that is relevant to each user. A content repurposing module 114 processes the content and generates a presentation that fits the target device. The user profile includes an interest profile 104 and a device profile 108 for the user. An Interest Profile 104 consists of a number of topics, each of which is defined by a set of keywords, and is provided by the user via a Web interface. The delivery method as well as the content presentation depends on the user's Device Profile 108, which specifies the device characteristics such as display resolution and connectivity type. The device profile 108 is also provided by the user via a Web interface. The content delivery platform has gateways that manage the interfaces to network access devices with a plurality of protocols and servers. The network access devices 118 may be as simple as numeric pagers to as complex as handheld devices capable of playing video.

A typical situation for the Audiovox Smartphone is the prototype system finding a news story matching a user's interest profile. The prototype system extracts a pertinent video segment, repurposes the content to fit the target device, and delivers the message to the user through the standard GPRS-based multimedia messaging service (MMS). Upon receiving the message, the phone notifies its user. The user then takes out the phone and downloads the entire MMS message. Such a process, unfortunately, is not only interruptive but also consumes significant power on the network access phone device.

The energy cost in the Audiovox Smartphone from a 70 second video message of CNN's coverage on eBay's acquisition of Skype is shown in the following table. This table also shows the energy cost by the text and key frame versions of this same message.

|  | Message Format | | |
| --- | --- | --- | --- |
|  | Text | Keyframes Size (Byte) | Video |
|  | 160 | 10K | 696K |
| Downloading Automatic | ~0.03 | ~1.2 | ~80 |
| energy (Joule) Manual | ~0.08 | ~1.7 | ~114 |
| Consuming energy (Joule) | ~5 | ~10 | ~48 |

Note that the exact energy cost may vary, depending on external factors such as cellular network quality and user behavior. The data presented were averaged over several measurements. Note that "Downloading energy," energy consumption by downloading the message, is different for automatically fetching and manual downloading. Manual downloading incurs additional display energy, as the display typically remains on while a user waits for the download to finish. "Consuming energy" is the energy consumption for the user to access the message, which is mostly consumed through display. It is assumed that text is consumed with a typical reading rate of 300 words per minute, four key frame images are consumed with 4 seconds/shot, and video is consumed during play time with the speaker on. Note that the prototype system provides entire messages in a predefined MMS format for cellular phones.

This table offers many insights. First, the energy cost of a video clip message is extremely high. The Audiovox Smartphone will run out of battery if the user receives and consumes 90 such messages, even without any other usage. Second, the energy costs of different media formats differ drastically by orders of magnitude. It is therefore possible to trade information richness for a longer battery lifetime. Third, manual downloading costs more than 40% more energy, mostly because of the power needs of the display. Fourth, "Consuming energy", especially by the display, dominates whether the message is delivered as text or key frames.

Therefore there remains a need for cost-effective techniques to improve the original prototype system for better battery lifetime and usability.

SUMMARY OF THE INVENTION

The present invention addresses the needs described above by providing a method and apparatus for an energy-efficient multimedia messaging system. One embodiment is a system which utilizes a hierarchical structure for message delivery and user interfaces. The invention is hierarchical in two aspects. First, the message content is hierarchical. A message can be delivered as text, or enhanced with key frame images or video clips with different resolution and frame rates. In this system, the messaging server generates and stores a message in different formats but sends only a short text message at first to the network access device, which includes links to other feature rich formats. Upon receiving the text message, the network access device automatically determines which format to fetch from programmatic instructions stored in its memory. Second, a low-power alerting device can be used for retrieving text messages, allowing minimal usage of the power-hungry display on the network access device. After receiving a text message, the network access device can determine from programmatic instructions stored in its memory, whether to notify the user immediately or send a message to the low power alerting display. All of these operations are done in consideration of a power optimized priority and message priority from programmatic instructions stored in the network access device memory.

In accordance with an aspect of the invention, a method is provided for saving power on a network access device. The method comprises the steps of: receiving a notification message that identifies multimedia content available for play on the network access device; checking the notification message for a user defined multimedia content presentation preference; implementing a power optimization policy for the network access device; and responsive to at least one of the user defined multimedia content presentation preference and the power optimization policy, optionally sending the notification message to an alerting device configured to enable a user to select at least some of the multimedia content available for play on the network access device.

In accordance with another aspect of the present invention, a method is provided for making available multimedia content for play on a network access device. The method comprises the steps of: receiving at least one user defined multimedia content presentation preference and associating the multimedia content presentation preference with multimedia content; and sending a notification message to a network access device, the notification message identifying multimedia content available for play on the network access device

DETAILED DESCRIPTION OF THE PREFERRED EMBODIMENT

Figure 1:
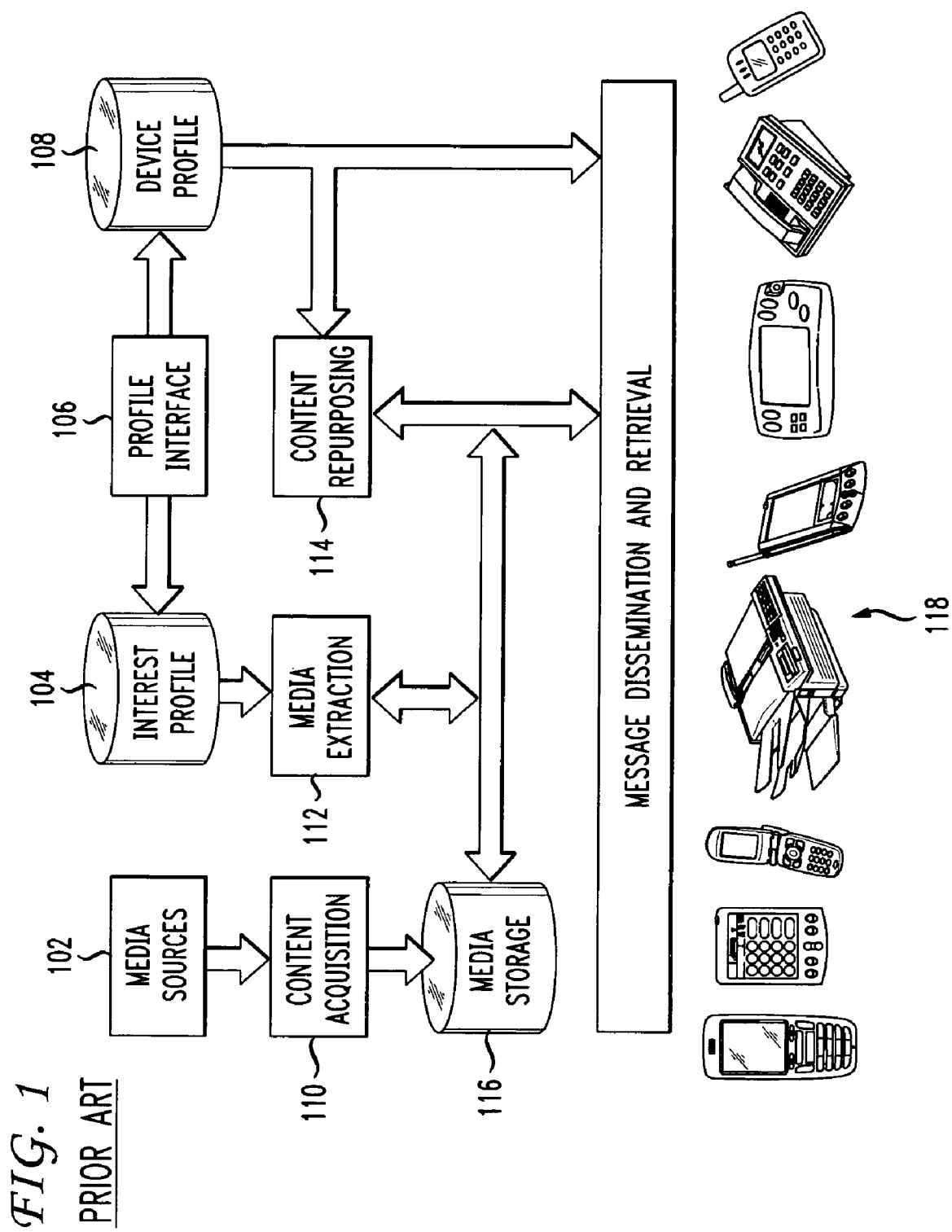
FIG. 1 is a schematic of a system architecture of a prior art messaging system.

The inventors have developed a method and system to reduce usage of the wireless interface and increase the efficiency of the user interface to maximize battery life in network access devices in a multimedia messaging system.

Embodiments of the invention will be described with reference to the accompanying drawings wherein like numbers represent like elements throughout. Before embodiments of the invention are explained in detail, it is to be understood that the invention is not limited in its application to the details of the examples set forth in the following description or illustrated in the drawings. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 2:
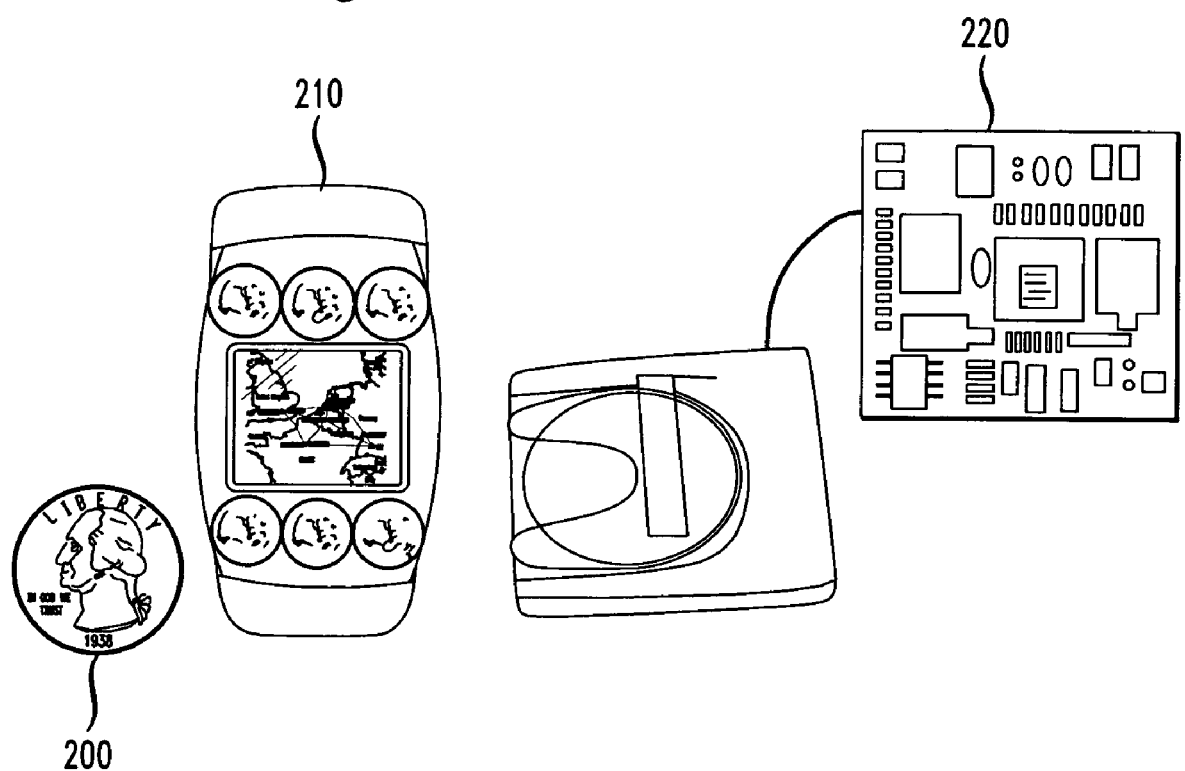
FIG. 2 is an illustration of an exemplary low power alerting device in accordance with one aspect of the invention.

To address the interruptive and transient nature of this invention's underlying message notification, this embodiment uses a low-power alerting device, as a secondary display to deliver messages to mobile users. FIG. 2 shows 210 the alerting device and 220 its printed-circuit board (PCB). The alerting device can be associated with a Bluetooth capable network access device, called the host, and serves as a low-power remote display for the host. The current version is based on a TI MSP430 microcontroller, an OEM Bluetooth module from KCWireFree, and a 96 by 128 dot-matrix LCD module from Epson. Without an operating system, the alerting device runs as interrupt driven. It caches text messages from the host and displays them according to their metadata. The 210 alerting device displays message notifications of whatever is in its memory with new additions appearing periodically on a scheduled basis. In addition, the alerting device takes user input control and selections and sends them through the Bluetooth connection to the network access device. Therefore, from 210 the alerting device, the user can choose to retrieve the text version of the message on the alerting device. The user can also make a selection on the alerting device which can be sent to the network access device to download a richer version of the message without directly operating the network access device, thus avoiding use of the power-hungry display on the network access device for control and instruction selections.

Figure 3:
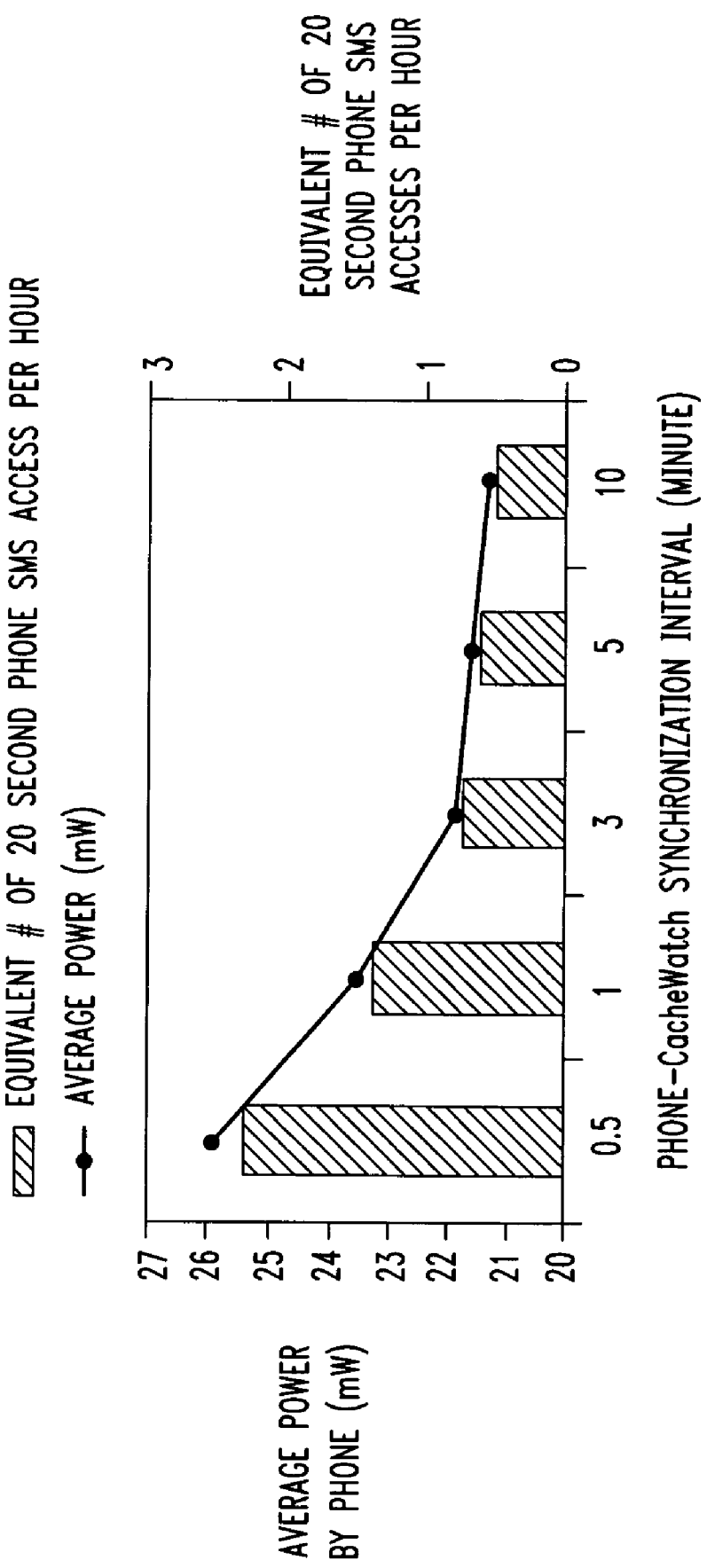
FIG. 3 is a chart of depicting power overhead from Bluetooth synchronization in accordance with an aspect of the invention.

There is, overhead associated with using the alerting device. First, to minimize Bluetooth energy consumption, the alerting device does not stay connected with its host. Every time they are connected, the host notifies the alerting device when to connect again. Therefore, when the host receives a new SMS message, it has to wait until the next connection interval to send the message notification to the alerting device. This waiting for the next connection introduces a notification delay. Nevertheless, such a delay can be reduced and is often tolerable with multimedia content delivery. Second, the host device has energy cost from Bluetooth, which should be smaller than what is saved from using the alerting device instead of the host to retrieve text messages. FIG. 3 is graphical representation of the average network access battery power consumption when the network access device synchronizes with the alerting device at different intervals. The graph in FIG. 3 assumes that it takes 20 seconds for a user to review a text message on the Audiovox Smartphone. FIG. 3 also shows the battery usage of 20 second phone accesses per hour compared to average phone power consumption. For example, when the synchronization interval is 10 minutes, the alerting device only needs to reduce one text message access to the Smartphone in two hours to save the latter's battery lifetime.

Figure 4:
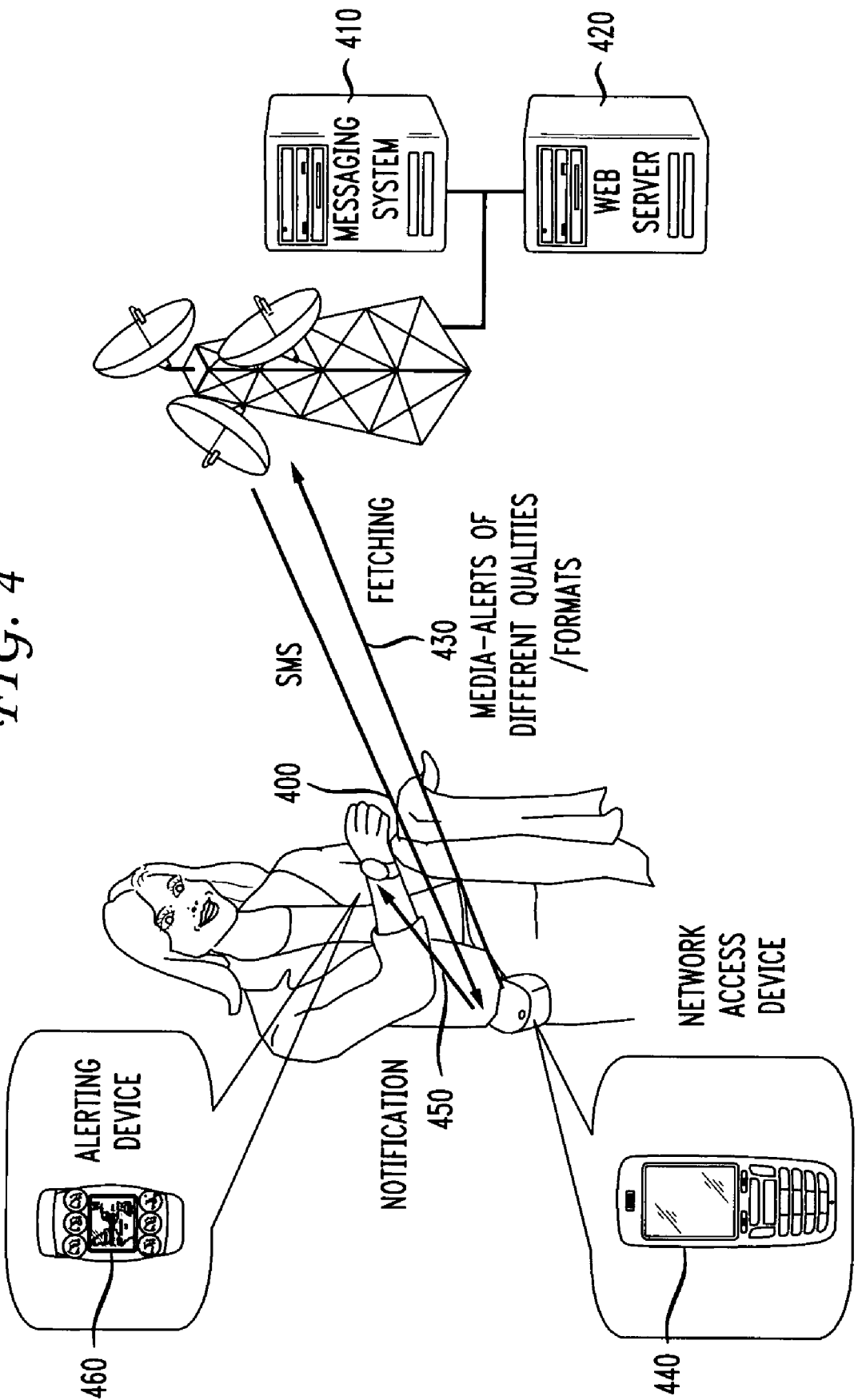
FIG. 4 is a schematic of a message delivery cycle in accordance with an aspect of the invention.

The present invention implements the improvements described above. FIG. 4 presents an overview of this embodiment of the invention. This invention augments the existing messaging system 410 with a web server 420 for message retrieval and with the capability to generate multiple versions of a message 430. This embodiment reuses most of the original infrastructure illustrated in FIG. 1—(Prior Art). In this embodiment the improvements can be implemented as software installed on network access devices. In this embodiment of the invention, mobile users sign up for the multimedia messaging service and specify their device and interest profiles on the web server 420. To accomplish this, the user specifies message interests by keyword, assigns a priority to each keyword, and specifies their Network Access Device.

They also download and install policy software into their network access device 440 for progressive content delivery, battery conservation, and message download management. Users may choose to use the alerting device 460; however the messaging service works without it.

This embodiment provides powerful mechanisms in addition to the software policies on network access devices to save energy. It provides software developers the mechanisms of hierarchical content delivery, monitoring battery power on the network access device, and using low power displays with additional software definable policies.

To generate message priorities, users associate one of three urgency levels as an attribute with each keyword in the messaging system. The three urgency levels are: critical, informative, and deferrable. The message priority score can be quantified by accumulating the contributions of all the matched keywords with level information and must satisfy the following properties:

Between 0 and 1; the larger, the more urgent.

Matches of higher-urgency keywords result in higher priority assigned to a message.

More keyword matches contribute to higher priority assigned to a message.

Since priority can be considered as the reverse of a user's delay tolerance, a calculation of a delay-tolerance score (DTS) is done as follows. First, each urgency level has an initial value, 1 for critical, 5 for informative, and 10 for deferrable, by default. Users can increase or decrease an initial value, indicating higher or lower delay tolerance for that level relative to other levels. Second, for the first match of a keyword in a level, it contributes the initial value of that level; the next match of the same level keyword contributes one less than the value of the previous match; when a keyword match makes the contribution value 0, all the remaining matches of this level will contribute 0. For example, for 3 matches of critical keywords, the contribution values are 1, 0, and 0; 3 matches of the informative are 5, 4, and 3; 3 matches of the deferrable are 10, 9 and 8. The following equation shows the calculation of the message Delay Tolerance Score DTS $$DTS = \frac{\sum_{i=1}^{l} Ci + E \cdot \sum_{i=1}^{m} Ii + F \cdot \sum_{i=1}^{n} Di}{d \cdot (l + m + n)}$$

Here there are l matches of critical keywords, m of informative, and n of deferrable keywords; where $Ci$ is the contribution by the ith match of critical keywords; $Ii$ is that by the ith match of informative; $Di$ is that by the ith match of deferrable; E=0 if Ci>0 for some i, otherwise E=1; F=0 if Ci>0 or Ii>0 for some i, otherwise F=1; d is the initial value of the deferrable keywords, or 10 by default. The message priority score is finally calculated as (1−DTS).

The following equation shows the calculation for an Energy Optimal Score.

$$EOS = \frac{RBC}{ECR \cdot EWT}$$

Battery information is used in both downloading and notification policies. First, software on a Network Access Device reads the device's remaining battery capacity (RBC) every 15 minutes and estimates the current energy consumption rate (ECR) based on extrapolation. Second, it predicts the next battery charging time to derive an expected work time (EWT), based on history charging record or the user profile. It then calculates an energy-optimal score (EOS).

Figure 5:
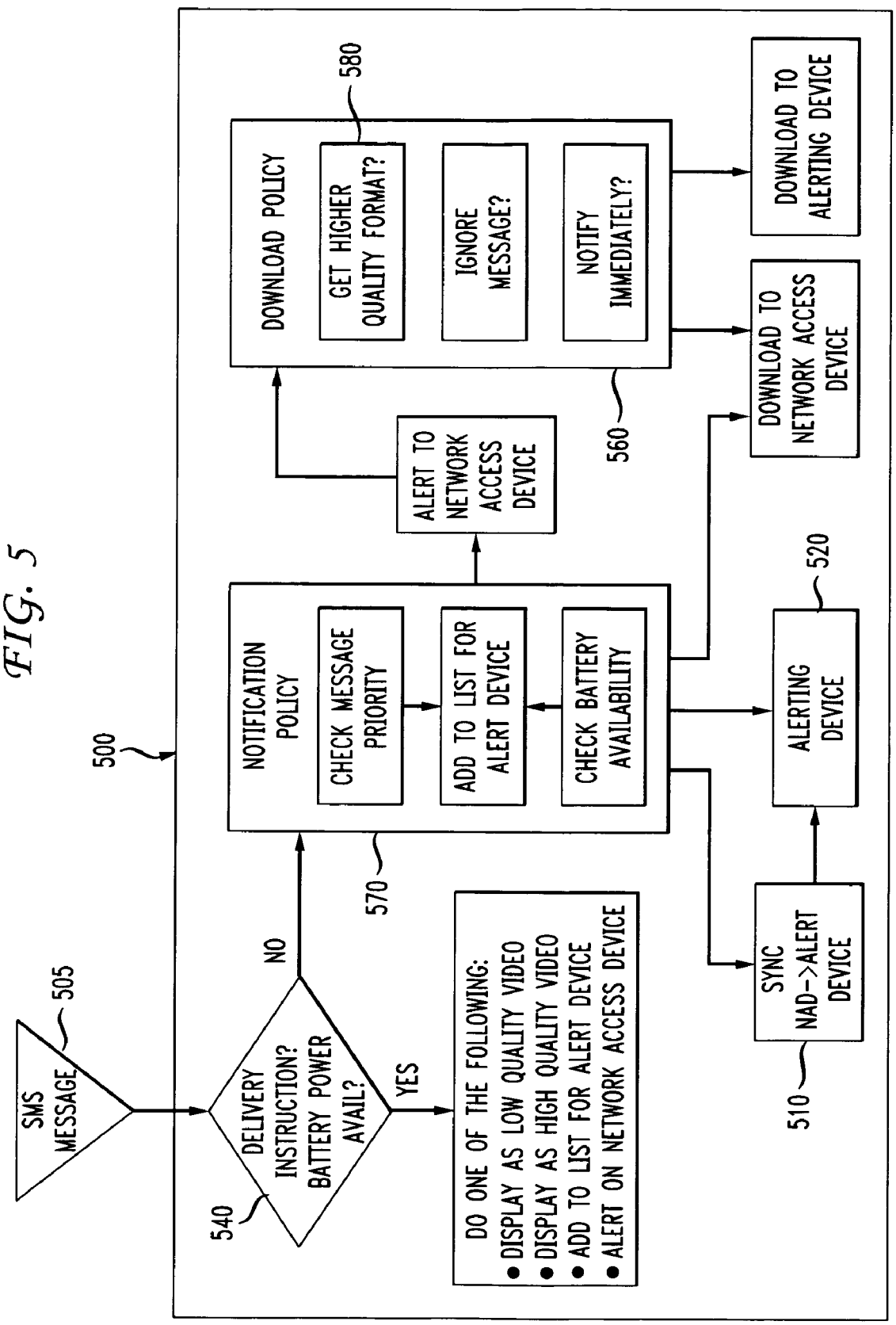
FIG. 5 is a flow diagram of message delivery policies in accordance with an aspect of the invention.

FIG. 5 shows this embodiment's implementation of policies capitalizing on energy savings mechanisms. In the depiction of the implementation of these policies 500, the policies are implemented as software and stored in the network access device in this embodiment. FIG. 5 illustrates the message delivery process based on these policies. A message always arrives as an SMS 505. In the simple case, the software automatically retrieves it and checks for a delivery instruction 540. If there is an instruction, and if there is sufficient battery power available, the delivery instruction is executed, and the system is finished with this message. In the case where there is no message delivery instruction with the message, the policy software is executed to decide on how to process the message for notification and for delivery. The notification policy 570 checks the message priority and the battery power availability in order to determine whether to notify the user through the Alerting Device or through the Network Access Device to deliver the message. It also builds the list of notifications to have ready to send to the Alerting Device. The policy software 570 uses both the message priority score and energy score EOS notification policy to maximize the energy saving mechanisms described above. To deliver the message to the Network Access Device the download policy 570 runs to determine whether to download the message with higher quality 580, to ignore the message, or to notify the user immediately with the default notification method on the Network Access Device, e.g. beep or vibrate. If the notification policy determines to notify the user through the alerting device, it waits for the next NAD (Network Access Device) 510 sync to Alerting device 520 communication to send the text message to the alerting device. The user may interact with the 520 alerting device, to confirm this message as read, or choose to download a higher quality version of it. The user's choice will be delivered to the Network Access Device upon the next NAD-Alerting Device communication. Text messages cached on the Alerting Device age and will be replaced by new messages when the Alerting Device storage fills.

The following equation shows the formula for battery policy and downloading policy.

$$Y = P \cdot EOS - \frac{S}{10^6}$$

A well designed prioritization and battery conserving notification policy will route most of the message notifications to the alerting device and let the user decide whether to download higher quality versions after reading the text ones. Only a very few high priority messages requiring immediate user attention will be handled by the downloading policy. This formula shows the priority policy calculation with P as the priority score, EOS as the energy optimal score, and S as the size in bytes of the smallest video format of the message. This embodiment does not provide support for multiple video formats for automatic downloading at this time. If Y<0 and P*EOS<=0.5, the user will be notified immediately without downloading; if Y<0, and 0.5<P*EOS or 0<=Y<0.5, the user will be notified after the key frames for the message are downloaded; only when Y>0.5, the user will be notified after the video clip for the message is downloaded.

Since neither EOS nor P is greater than 1, the policy will not download a large video clip, especially when it is larger than 1 MB. The policy implicitly makes a tradeoff between user attention discretion and energy consumption. That is, when the energy supply is not optimistic with a small EOS, the policy relies on user discretion instead of automatically downloading higher quality messages. The parameters in the policy are empirically determined and can be adjusted by the user.

Figure 6:
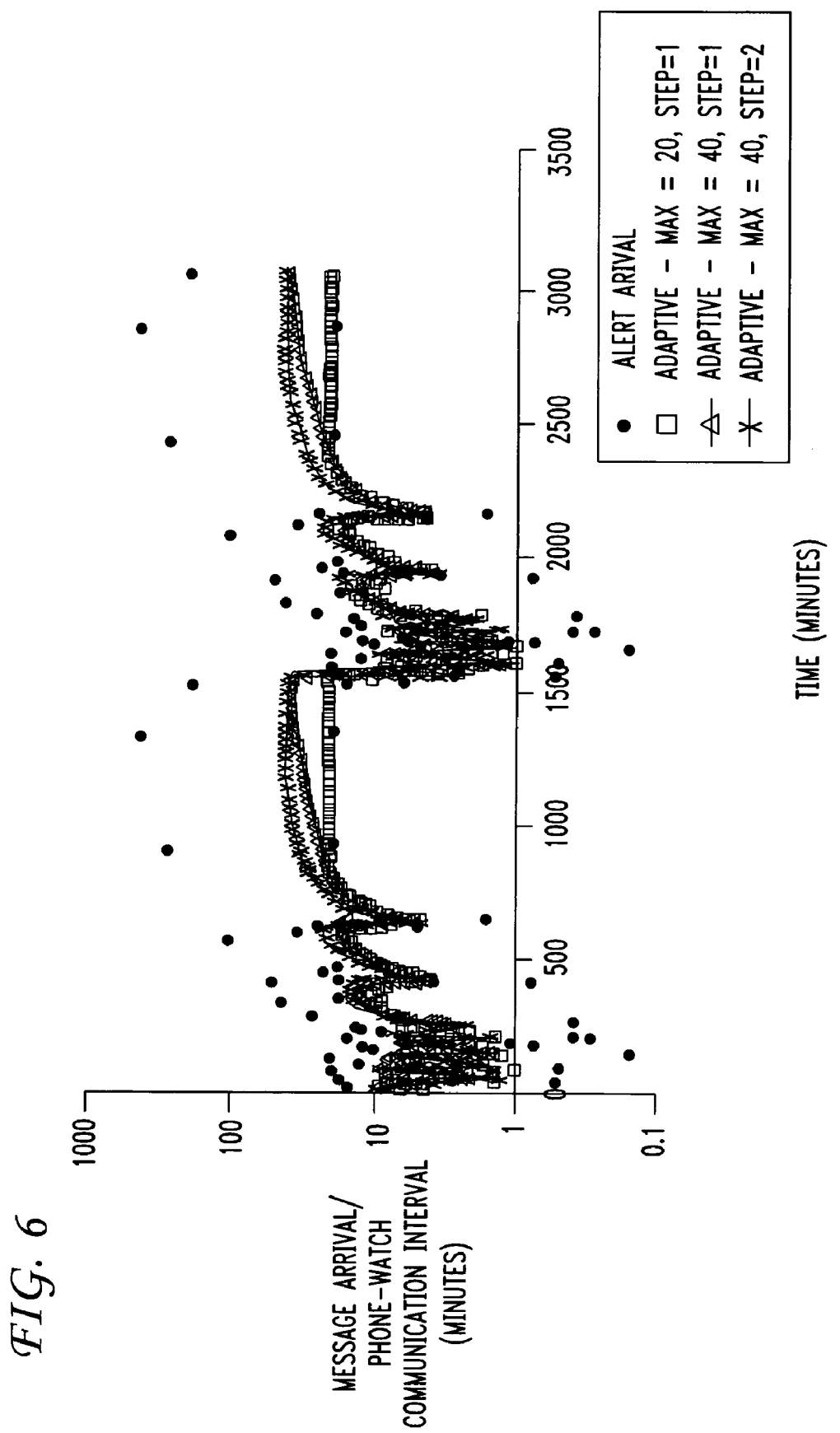
FIG. 6 is a message arrival and interval trace.

FIG. 6 is a graph representing a Message Arrival and Communication Trace. The more often the network access device communicates with the alerting device, the shorter a message takes to show up on the alerting device, and the more Bluetooth energy will be consumed. There are two ways to improve the tradeoff between the energy cost and delivery delay. The first is having priori knowledge of the message traffic to allow use of short communication intervals when the traffic is high. For example, many TV programs are broadcast on a fixed schedule. If a user is interested in a certain program, he or she is more likely to receive messages in the corresponding program time, and can therefore set the network access device to communicate with the alerting device more often during that time. The second is using a simple adaptive scheme to adjust the communication intervals according to the message traffic. This embodiment uses the following method. First set the minimal and maximal communication intervals as 1 and MAX minutes, respectively, and start with an interval of 5 minutes. Suppose when the network access device communicates with the alerting device, there are N messages waiting to be sent and the previous interval was K minutes. Let K' denote the next communication interval in minutes. If N>1, K' will be set to the greater of 1 and K/N minutes; if N=1, it will be set to be the greater of 1 and (K−1); if N=0, it will be set to be the smaller of MAX and (K+STEP). STEP is a small number between 1 and 4.

The effectiveness of the adaptive algorithm was validated with synthetic message traces, generated with two assumptions: 1) messages arrive according to a Poisson process in a certain period of the day and 2) different time windows of the day have different density of message arrivals. Each trace covers multiple days. Each day consists of morning, afternoon, evening, and night, in which messages arrive randomly according to Poisson processes with different densities. FIG. 6 shows how the arrival time changes during a two-day trace. It also shows how the adaptive communication schedule technique successfully adapts to the trace with different parameters (MAX and STEP).

Figure 7:
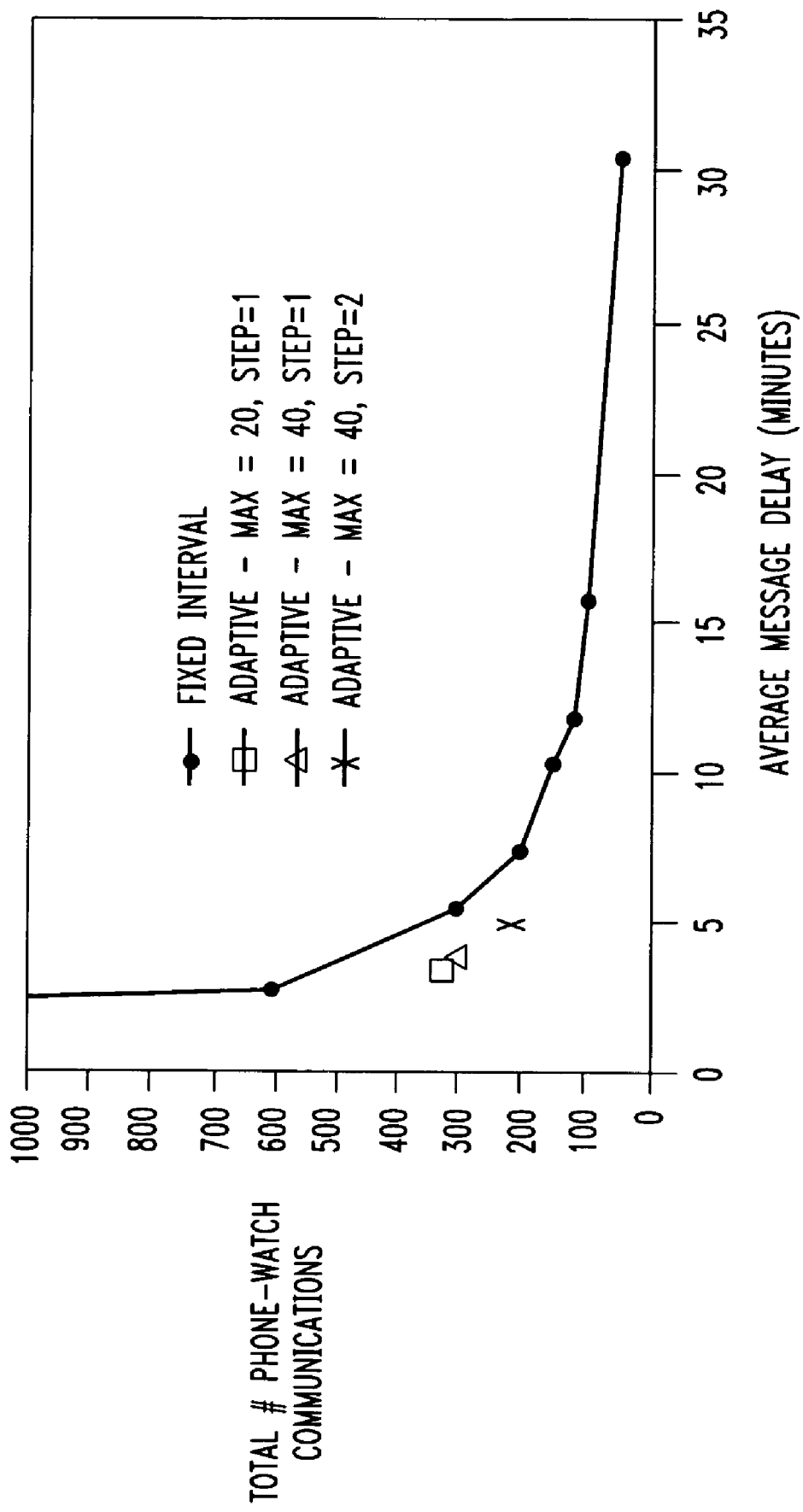
FIG. 7 is a chart representing the tradeoff between energy cost and message delay in the context of implementing aspects of the invention.

FIG. 7 is a graphical representation of tradeoffs between energy costs and message delay. This graph compares energy cost, in terms of the number of network access device to alert device communications, and the average delay of an item displayed on the alerting device. The solid line illustrates the tradeoffs made by using fixed communication intervals between 5 and 60 minutes. The tradeoffs made in this invention's adaptive technique with different parameters are better than the fixed interval approach in the Pareto sense. With the same average delay, the adaptive technique can save energy in network access device to alerting device communication by up to 40%. Although its effectiveness may vary with different message traces, the adaptive technique almost always outperforms communication with fixed intervals.

FIG. 7 also shows that using a larger MAX or STEP reduces the energy cost but increases the average message delay. With about an average delay of 4 minutes, the network access device and the alerting device communicate only about 300 times for two days, leading to about 1.3 mW power overhead in the Audiovox Smartphone and about 2 mW average power consumption by the alerting device. The 1.3 mW Smartphone power overhead can be easily compensated, according to data presented in FIG. 6 as power overhead from Bluetooth synchronization.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method of the invention is described herein with respect to a prototype multimedia messaging system, the method and apparatus of the invention may be instead embodied by employing a breadth of network access device alternatives and altering the policies and mechanisms for power conservation, for example. It is further noted that the invention is not limited to use with battery recharging time to estimate the expected work-time for network access devices as described in this specification, but can be used with any power related parameter key to a network access device existing today or developed in the future. It is to be understood that the embodiments shown and described herein are only illustrative of the principles of the present invention and that various modifications may be implemented by those skilled in the art without departing from the scope and spirit of the invention.

What is claimed is:

1. A method for saving power on a network access device, comprising the steps of:
   receiving a notification message that identifies multimedia content available for play on the network access device, wherein the multimedia content is in a plurality of formats in different qualities,
   checking the notification message for a user defined message priority score, wherein the priority corresponds to one of a plurality of urgency levels including critical, informative, and deferrable, as an attribute for each message;
   implementing a power optimization policy for the network access device wherein the power optimization policy adjusts battery consumption based on the user defined priority; and
   responsive to the user defined message priority score and the power optimization policy, wirelessly sending the notification message to an alerting device configured to enable a user to select at least some of the multimedia content available for play on the network access device, further comprising a message download policy in accordance with $Y=(P*EOS)-S/10^6$, wherein P is a priority score, EOS is an energy optimization score, and S is the size in bytes of the smallest video format of the multimedia content, and the method further comprises the step of automatically downloading the highest quality multimedia content for small values of Y.

2. A method for saving power on a network access device, comprising the steps of:
   receiving a notification message that identifies multimedia content available for play on the network access device;
   checking the notification message for a user defined message priority score;
   implementing a power optimization policy for the network access device; and
   responsive to the user defined message priority score and the power optimization policy, wirelessly sending the notification message to an alerting device configured to enable a user to select at least some of the multimedia content available for play on the network access device, wherein the power optimization policy includes checking remaining battery life and is based on an energy optimization score $EOS=RBC/(ECR-EWT)$ wherein RBC is the remaining battery capacity, ECR is an estimate of the current energy consumption rate and EWT is the expected work time based on charging history or user specification.

3. A method for saving power on a network access device, comprising the steps of:
   receiving a notification message that identifies multimedia content available for play on the network access device;
   checking the notification message for a user defined message priority score;
   implementing a power optimization policy for the network access device; and
   responsive to the user defined message priority score and the power optimization policy, wirelessly sending the notification message to an alerting device configured to enable a user to select at least some of the multimedia content available for play on the network access device.

4. The method of claim 3, wherein the notification message is an SMS message.

5. The method of claim 3, wherein the multimedia content is in a plurality of formats of different viewing qualities.

6. The method of claim 1, wherein the power optimization policy includes checking remaining battery life.

7. The method of claim 1, wherein the power optimization policy is based on at least one of remaining battery life, extrapolated energy consumption, and next recharge time.

8. The method of claim 5, wherein the power optimization policy adjusts battery consumption based on the user defined priority.

9. The method of claim 7, wherein next recharge time and the remaining battery life are utilized to maximize at least one of the number and viewing quality of multimedia messages available for play.

10. The method of claim 8, wherein the priority corresponds to one of a plurality of urgency levels including critical, informative, and deferrable, as an attribute for each message.

11. The method of claim 1, further comprising the step of synchronizing messages from the network access device to the alerting device at certain fixed or dynamic intervals.

* * * * *